(12) United States Patent
Amarnath et al.

(10) Patent No.: US 11,966,776 B2
(45) Date of Patent: Apr. 23, 2024

(54) LEARNING AGENT BASED APPLICATION SCHEDULING

(71) Applicant: INTERNATIONAL BUSINESS MACHINES CORPORATION, Armonk, NY (US)

(72) Inventors: Aporva Amarnath, Ann Arbor, MI (US); Augusto Vega, Yorktown Heights, NY (US); Alper Buyuktosunoglu, Yorktown Heights, NY (US); Hubertus Franke, Yorktown Heights, NY (US); John-David Wellman, Yorktown Heights, NY (US); Pradip Bose, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 17/305,784

(22) Filed: Jul. 14, 2021

(65) Prior Publication Data
US 2023/0012710 A1    Jan. 19, 2023

(51) Int. Cl.
| G06F 9/46 | (2006.01) |
| G06F 9/445 | (2018.01) |
| G06F 9/48 | (2006.01) |
| G06N 20/00 | (2019.01) |

(52) U.S. Cl.
CPC ........ *G06F 9/4881* (2013.01); *G06F 9/44505* (2013.01); *G06F 9/485* (2013.01); *G06N 20/00* (2019.01)

(58) Field of Classification Search
CPC .... G06F 9/4881; G06F 9/44505; G06F 9/485; G06N 20/00
See application file for complete search history.

(56) References Cited

U.S. PATENT DOCUMENTS

| 8,937,886 B2 | 1/2015 | Shaffer et al. |
| 9,451,042 B2 | 9/2016 | Guerin et al. |
| 11,704,155 B2 | 7/2023 | Vega |
| 11,740,933 B2 | 8/2023 | Vega |
| 2014/0229221 A1 | 8/2014 | Shih et al. |
| 2014/0282572 A1* | 9/2014 | Kang ............... G06F 9/4881 |
| | | 718/103 |
| 2018/0113742 A1 | 4/2018 | Chung et al. |
| 2018/0210754 A1 | 7/2018 | Vaish et al. |
| 2018/0267806 A1 | 9/2018 | Chirayath Kuttan |
| 2019/0332441 A1 | 10/2019 | Fachini et al. |
| 2020/0257968 A1 | 8/2020 | Mitra et al. |

(Continued)

OTHER PUBLICATIONS

Yang, M. (2020). "Sharing GPUs for Real-Time Autonomous Driving Systems" (Doctoral dissertation, University of North Carolina at Chapel Hill). Year: 2020.

(Continued)

*Primary Examiner* — Gregory A Kessler
(74) *Attorney, Agent, or Firm* — Stephen R. Yoder

(57) ABSTRACT

Tasks of directed acyclic graphs (DAGs) may be dynamically scheduled based on a plurality of constraints and conditions, task prioritization policies, task execution estimates, and configurations of a heterogenous system. A machine learning component may be initialized to dynamically schedule the tasks of the DAGs.

20 Claims, 9 Drawing Sheets

(56) References Cited

U.S. PATENT DOCUMENTS

2022/0050714 A1* 2/2022 Grimshaw ............ G06F 9/5038

OTHER PUBLICATIONS

Krishnakumar, A. et al., "Runtime Task Scheduling using Imitation Learning for Heterogeneous Many-Core Systems", arXiv:2007.09361, Aug. 6, 2020.

Yang, M. et al., "Making OpenVX Really "Real Time"", In 2018 IEEE Real-Time Systems Symposium (RTSS) (pp. 80-93). IEEE. (Dec. 2018).

Zahaf, H. E. et al., "A C-DAG task model for scheduling complex real-time tasks on heterogeneous platforms: preemption matters", arXiv:1901.02450. Jan. 8, 2019.

Xie, G. et al., "Mixed real-time scheduling of multiple DAGs-based applications on heterogeneous multi-core processors". Microprocessors and Microsystems, 47, 93-103. (2016).

Qin, X., & Jiang, H., "Dynamic, Reliability-Driven Scheduling of Parallel Real-Time Jobs in Heterogeneous Systems", In International Conference on Parallel Processing, 2001. (pp. 113-122). IEEE. (Sep. 2001).

Iverson, M., & Ozguner, F., "Dynamic, Competitive Scheduling of Multiple DAGs in a Distributed Heterogeneous Environment", In Proceedings Seventh Heterogeneous Computing Workshop (HCW'98) (pp. 70-78). IEEE. (Mar. 1998).

Sung, T. T., Chockalingam, V., Yahja, A., & Ryu, B., "Neural Heterogeneous Scheduler", arXiv:1906.03724, (2019).

Tegg Taekyong Sung, et al. "DeepSoCS: A Neural Scheduler for Heterogeneous System-on-Chip (SoC) Resource Scheduling." Electronics, 2020.

Mao, Hongzi, et al. "Learning scheduling algorithms for data processing clusters.", arXiv:1810.01963 (2018).

Glaubius, Robert, et al., "Real-Time Scheduling via Reinforcement Learning." arXiv:1203.3481(2012).

* cited by examiner

LEARNING AGENT BASED APPLICATION SCHEDULING

This invention was made with Government support under HR-0011-18-C-0122 awarded by the Defense Advanced Research Projects Agency (DARPA). The Government has certain rights to this invention.

BACKGROUND

The present invention relates in general to computing systems, and more particularly, to various embodiments for learning agent based application scheduling in heterogenous computing systems using a computing processor.

SUMMARY

According to an embodiment of the present invention, a method for providing learning agent based application scheduling in heterogenous systems in a computing environment, by one or more processors, is depicted. Tasks of directed acyclic graphs (DAGs) may be dynamically scheduled based on a plurality of constraints and conditions, task prioritization policies, task execution estimates, and configurations of a heterogenous system. In an additional embodiment, a machine learning component initialized may be initialized (e.g., initialized, active, and/or installed) to dynamically schedule the tasks of the DAGs.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
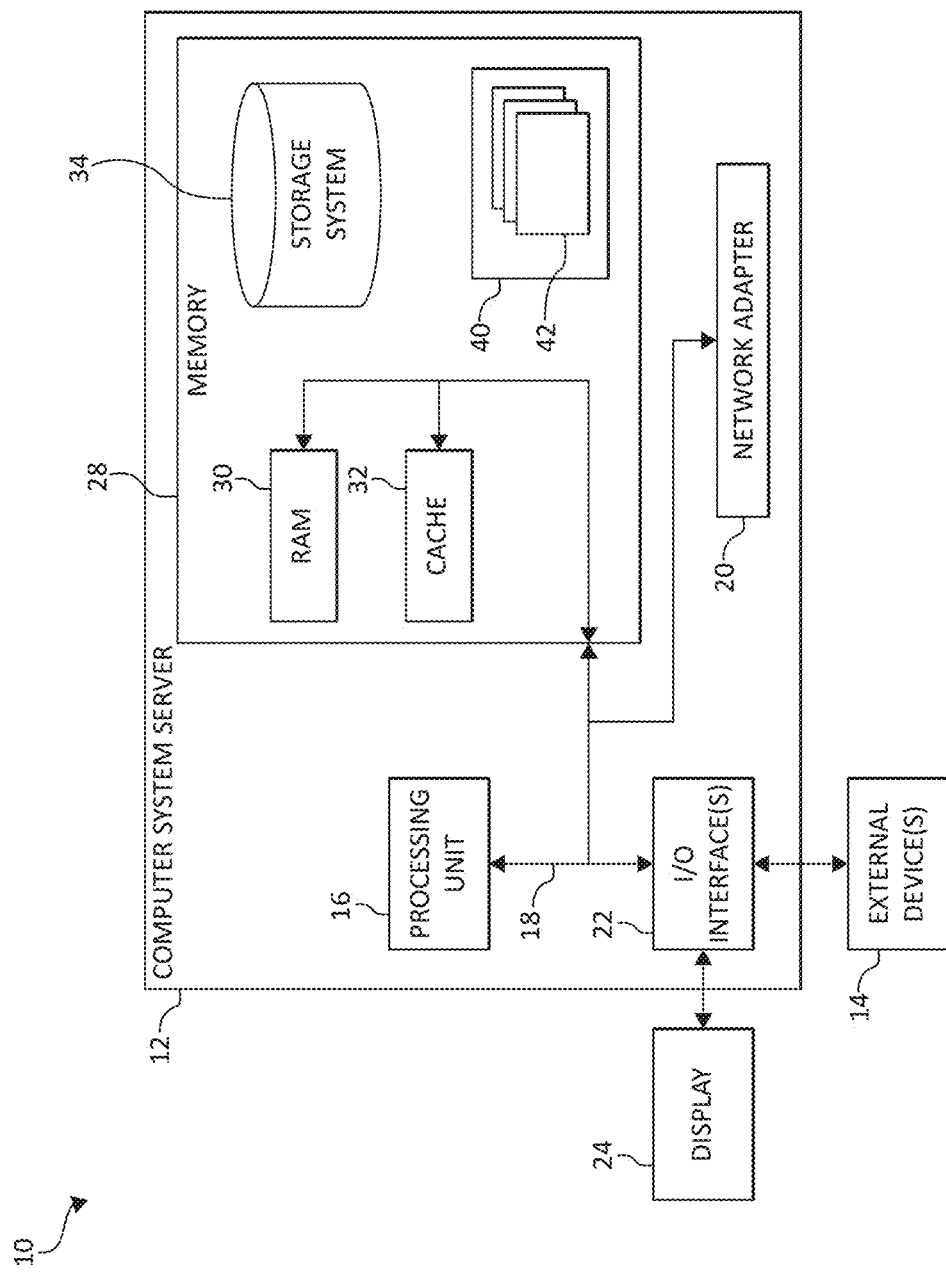
FIG. 1 is a block diagram depicting an exemplary cloud computing node according to an embodiment of the present invention.

The present invention relates generally to computing systems, and more particularly, to various embodiments for learning agent based application scheduling in heterogenous computing systems and the like.

In today's computing environment, computer systems are often made up of several different processing units such as, for example, central processing units ("CPUs"), graphics processing units ("GPUs"), field programmable gate arrays ("FPGAs"), accelerators, Input/Output ("I/O") devices, and other dedicated processing units. Such systems are referred to as heterogeneous systems. In some computing systems, processors are heterogeneous system-on-chips (SoCs) containing CPU cores and GPU cores. That is, a heterogeneous SoC may include disparate processing elements ("PE") such as, for example, CPU cores, GPUs, accelerators, I/O devices, and the like. Applications on different processing elements (PEs) may have different memory characteristics, access patterns and performance requirements.

Heterogeneous SoCs are pervasively used today to meet increasing levels of integration and stringent performance and efficiency requirements of heterogeneous applications. For example, automotive applications can vary from radar detection, image processing, obstacle avoidance, communication, swarm intelligence to driving control decisions. These heterogeneous applications may be associated with priorities and deadlines to meet real-time and constraints such as, for example, safety constraints in a vehicle.

Due to the dynamism of surrounding external environments and conditions, the rate at which these applications need to be processed can vary. For example, driving in a city can cause a high influx of task/compute jobs into the heterogeneous SoC in comparison to driving on a highway or a rural road.

Executing tasks in an efficiently and effectively in a heterogeneous system requires scheduling the tasks in an organized and rapid manner. However, bottlenecks of scheduling real-time constrained applications on a heterogeneous SoC often occur based on, for example, real-time constraints and task dependencies, conditions (e.g., dynamic environmental conditions), and processor element capabilities and utilization.

For example, task prioritization is extremely sensitive to real-time constraints and execution time of the tasks. Optimal task ordering policies largely depends on the mission of the heterogeneous system, real-time constraints of the heterogeneous applications and dynamic environmental conditions such as, for example, traffic congestion and weather. Reordering of tasks can also be computationally expensive. Also, a task-to-PE assignment can lead to irregular PE utilization on a heterogeneous SoC, which can lead to or result in underutilization of computational resources and degradation of system performance and efficiency. Additionally, due to the dynamic arrival of tasks in the heterogeneous system, a higher priority task may arrive and displace an existing task in the queue, leading to larger wait times (e.g., larger than the slowest PE execution time). Moreover, dynamic environmental conditions (e.g., sudden changes in weather) cannot always be anticipated during run-time, which can lead to mission degradation or mission safety failures.

To fully exploit the potential of heterogeneous systems, there is a need for more efficient and dynamic scheduling of the tasks. Accordingly, mechanisms of the illustrated embodiments provide for learning agent based application scheduling in heterogenous systems. In one aspect, tasks of directed acyclic graphs (DAGs) may be dynamically scheduled based on a plurality of constraints and conditions, task prioritization policies, task execution estimates, and configurations of a heterogenous system. In some embodiments, the plurality of constraints and conditions, task prioritization policies, task execution estimates may include, but not limited to and used for illustration purposes only, real-time deadlines/constraints such as, for example, detecting a traffic sign/light prior to reaching a cross-section/intersection of a road for autonomous vehicles, power energy constraints in cloud servers, traffic of tasks to be scheduled along with the task priorities. The DAGs may be comprised of a collection of one or more nodes connected by one or more edges, each of the nodes represents one or more tasks ordered into a sequence, and each of the edges connected to a node represents one or more constraints on the task represented by the node. In an additional embodiment, a machine learning component may be initialized (e.g., initialized active, and/or installed) to dynamically schedule the tasks of the DAGs.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
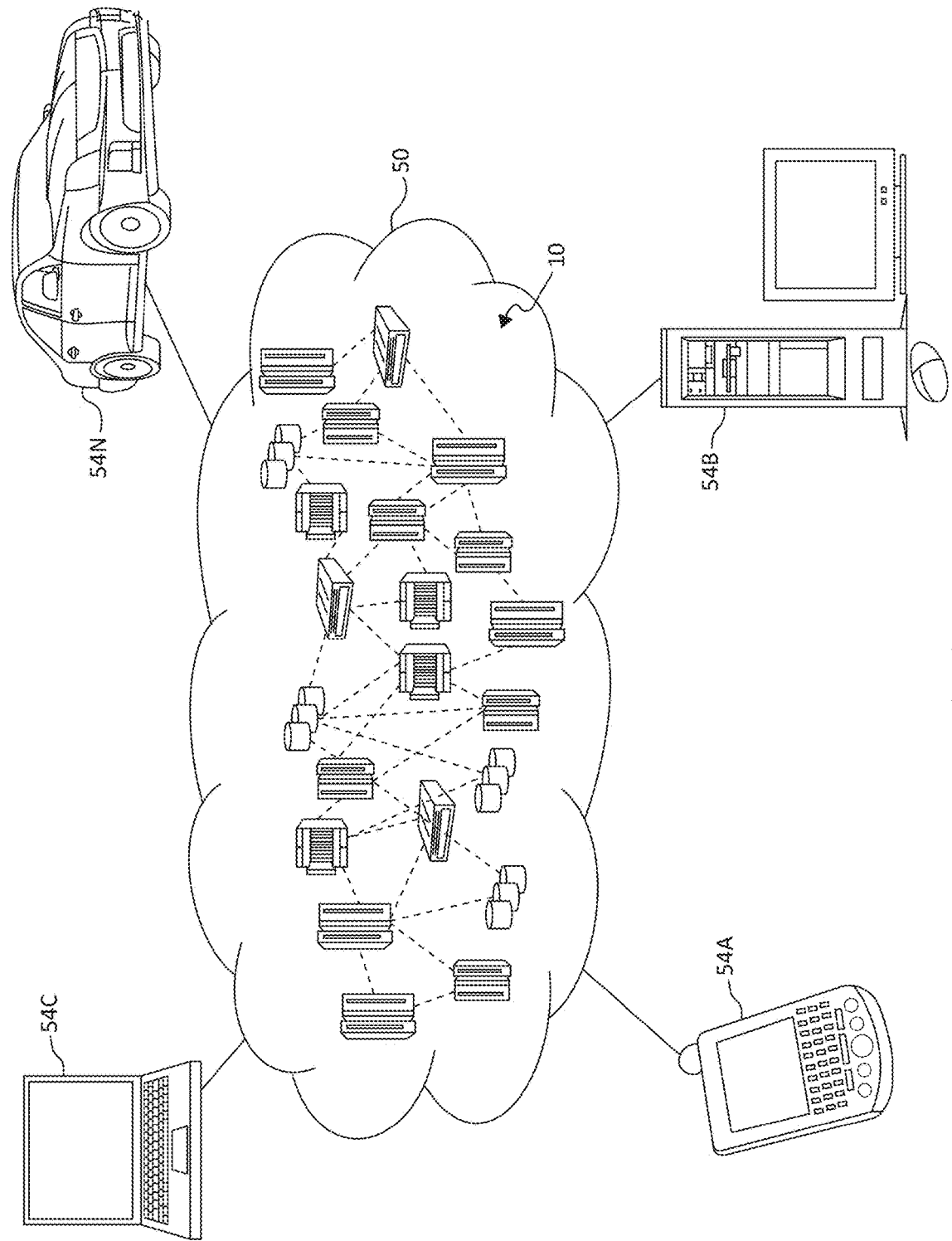
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
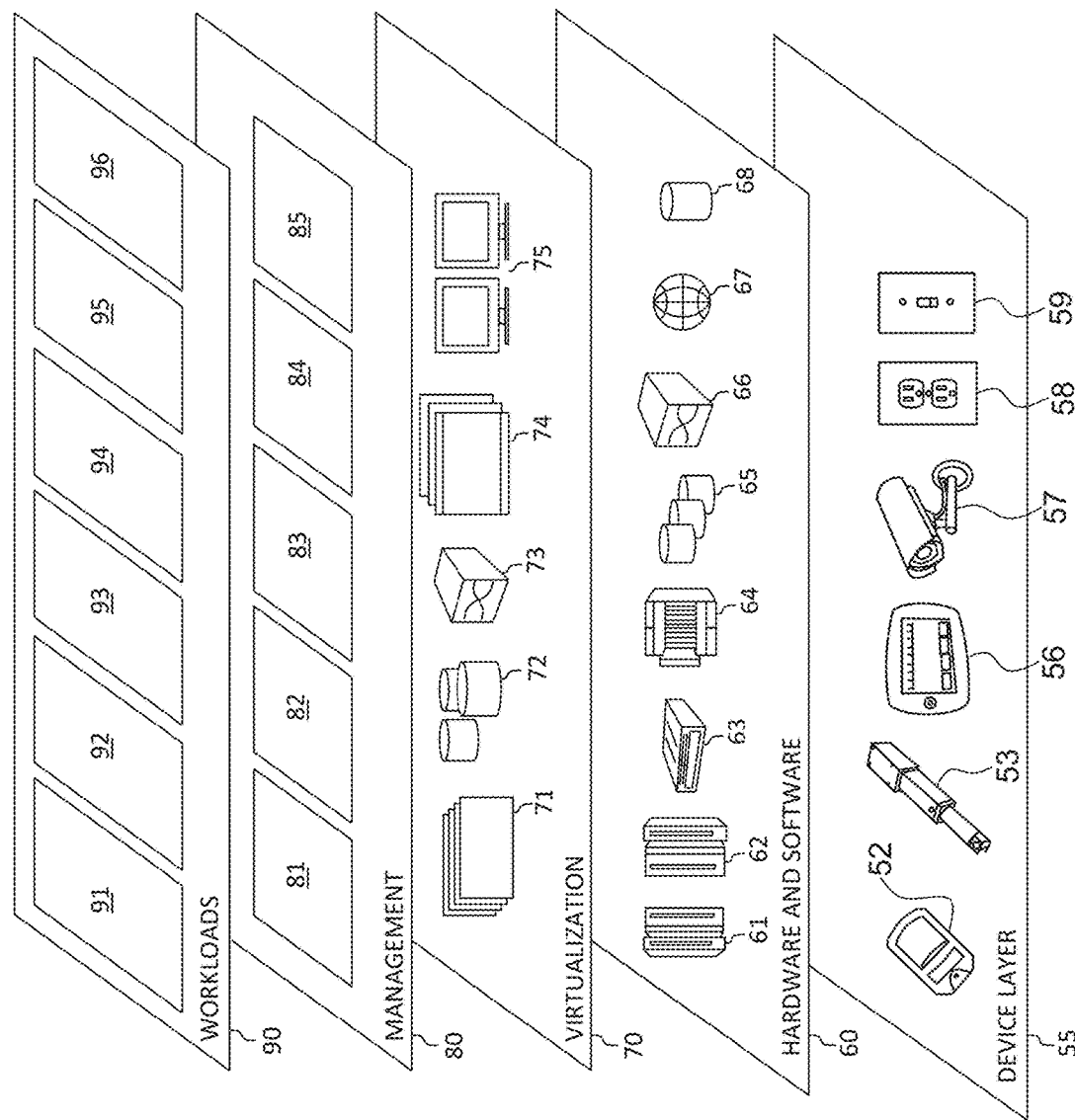
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74;
and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for dynamic task scheduling in heterogenous systems using a machine learning agent in a computing environment (e.g., in a neural network architecture). In addition, workloads and functions 96 for dynamic task scheduling in heterogenous systems using a machine learning agent in a computing environment may include such operations as analytics, deep learning, and as will be further described, user and device management functions. One of ordinary skill in the art will appreciate that the workloads and functions 96 for dynamic task scheduling in heterogenous systems using a machine learning agent in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing learning agent based application scheduling in heterogenous systems in a computing environment, by one or more processors, is depicted. Tasks of directed acyclic graphs (DAGs) may be dynamically scheduled based on a plurality of constraints and conditions, task prioritization policies, task execution estimates, and configurations of a heterogenous system. In an additional embodiment, a machine learning component may be initialized may be initialized (e.g., initialized, active, and/or installed) to dynamically schedule the tasks of the DAGs.

In one aspect, the present invention provides novel solutions for providing a machine learning process to improve a dynamic real-time scheduler. In step 1, the dynamic real-time scheduler may determine if a DAG should be dropped. In step 2, the dynamic real-time scheduler may estimate execution time of task on PEs on a heterogeneous SoC. In step 3, the dynamic real-time scheduler may determine environmental conditions such as, for example, congestion. In step 4, the dynamic real-time scheduler may use machine learning-based DAG processor policies. In step 5, the dynamic real-time scheduler may select and choose between multiple task prioritization policies and determine when to perform task reordering and rank updates. In step 6, the dynamic real-time scheduler may determine if a non-critical task/DAG can meet its real-time constraints or should be dropped and determine task wait times that can improve slow-core PE utilization for task scheduling. The dynamic real-time scheduler may determine when to use an offline machine learning model as compared to using an online machine learning model for steps 1-6. The dynamic real-time scheduler may determine when to use a machine learning model.

Figure 4:
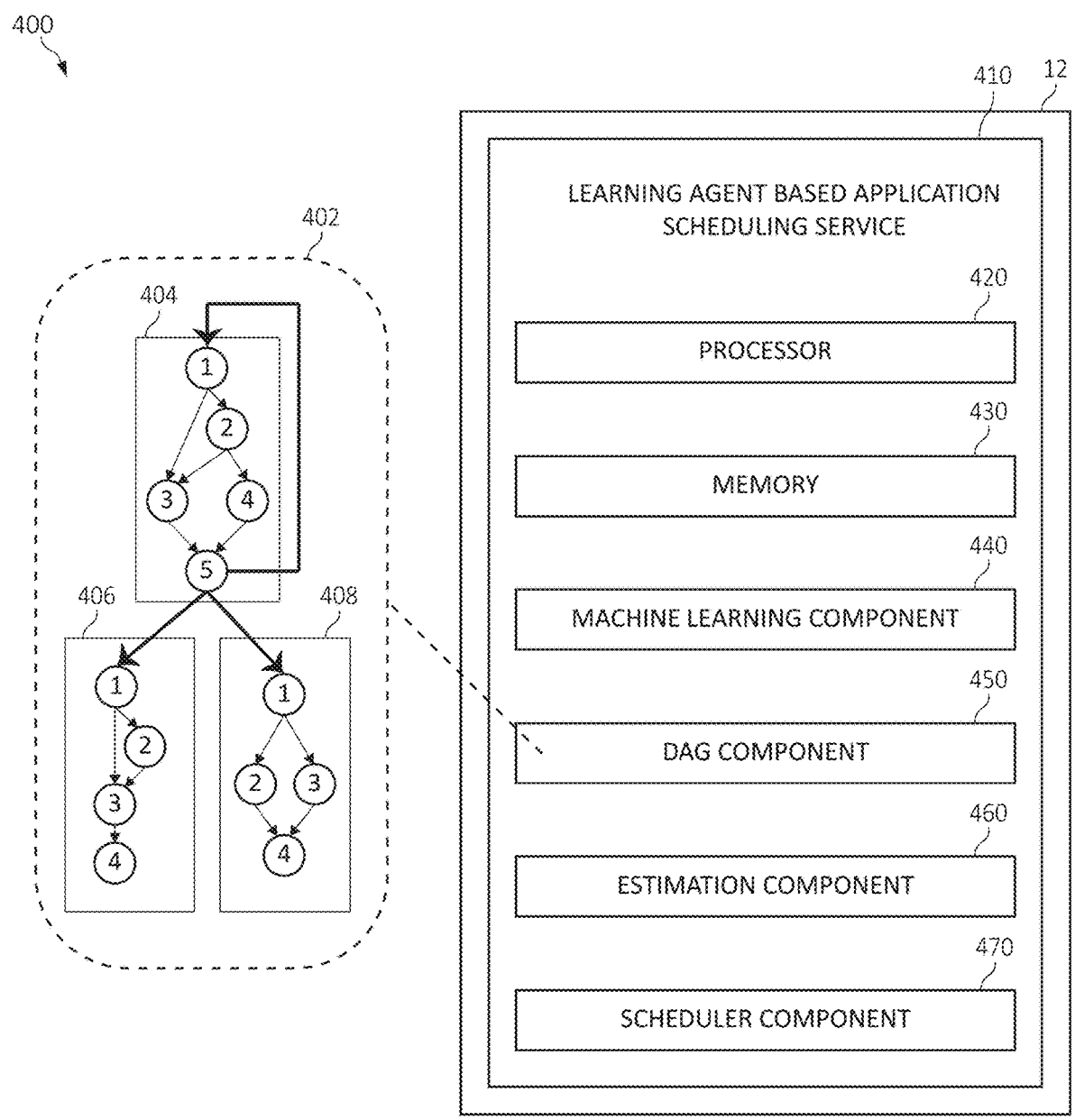
FIG. 4 is an additional block diagram depicting an exemplary functional relationship between various aspects of the present invention.

Turning now to FIG. 4, a block diagram depicting exemplary functional components of system 400 for providing learning agent based application scheduling in heterogenous systems in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A learning agent based application scheduling service 410 (e.g., dynamic scheduling agent) is shown, incorporating processing unit 420 ("processor") to perform various computational, data processing and other functionality in accordance with various aspects of the present invention. In one aspect, the processor 420 and memory 430 may be internal and/or external to the learning agent based application scheduling service 410, and internal and/or external to the computing system/server 12. The learning agent based application scheduling service 410 may be included and/or external to the computer system/server 12, as described in FIG. 1. The processing unit 420 may be in communication with the memory 430. The learning agent based application scheduling service 410 may include a machine learning component 440, a DAG component 450, an estimation component 460, and a scheduler component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, domain-specific applications running on a heterogeneous SoCs can be represented as a control flow graph 402 of multiple tasks. A task may be a unit of work that can be scheduled on a PE of a heterogeneous SoC. The control flow graphs such as, for example, control flow graph 402 may be represented as multiple DAGs such as, for example, the DAG's 404, 406, and 408.

The learning agent based application scheduling service 410 may, using the machine learning component 440, the DAG component 450, the estimation component 460, and/or the scheduler component 470, dynamically schedule one or more tasks of directed acyclic graphs (DAGs) such as, for example, DAG's 404, 406, and 408 based on constraints and conditions, task prioritization policies, task execution estimates, and configurations of a heterogenous system. In one aspect, a DAG may be comprised of a collection of one or more nodes such as, for example, nodes 1-5 of DAG's 404, 406, and 408. The nodes such as, for example, nodes 1-5 of DAG's 404, 406, and 408 may be connected by one or more edges, each of the nodes represents one or more tasks ordered into a sequence, and each of the edges connected to a node represents one or more constraints on the task represented by the node.

Since an application may be known at compile-time, the DAGs such as, for example, DAG's 404, 406, and 408 may be static in terms of their constituent tasks and their task dependencies. However, during runtime, a DAG's execution may be subject to dynamic circumstances that challenge their timing, performance and efficiency. The input to a Heterogeneous SoC is multiple static DAGs such as, for example, DAG's 404, 406, and 408 that arrive dynamically, and their arrival rate can be variable. Furthermore, due to real-time constraints of a system, a priority and deadline of each task may be assigned to each the DAGs such as, for example, DAG's 404, 406, and 408 using the DAG component 450 and the scheduler component 470.

In one aspect, the learning agent based application scheduling service 410 may, using the machine learning component 440, track each task dependencies in each of the DAGs such as, for example, DAG's 404, 406, and 408. The learning agent based application scheduling service 410 may, using the machine learning component 440, the DAG component 450, the estimation component 460, and/or the scheduler component 470, determine task priorities, task execution timelines, task wait times, and task deadlines for each of the one or more tasks of the plurality of DAGs. The learning agent based application scheduling service 410 may, using the machine learning component 440, the DAG component 450, the estimation component 460, and/or the scheduler component 470, rank the one or more tasks in the plurality of DAGs based on the plurality of constraints and conditions, the task prioritization policies, the task execution estimates, and the configurations of the heterogenous system.

The learning agent based application scheduling service 410 may, using the machine learning component 440, the DAG component 450, the estimation component 460, and/or the scheduler component 470, determine one or more processing elements of the heterogenous system to execute the one or more tasks in the plurality of DAGs based on the ranking.

In an additional aspect, the machine learning component 440 may be initialized to dynamically schedule the one or more tasks in the plurality of DAGs, wherein the machine learning operation learns the plurality of constraints and conditions, the task prioritization policies, the task execution estimates, and the configurations of the heterogenous system.

The machine learning component 440 may learn dynamic events that are unable to be predicted. In some embodiments, the machine learning component 440 may create ranking policies (e.g., task ranking policies) and learn dynamic events that can be used at different scheduling operations and decisions.

The machine learning component 440 may estimate an execution time for the one or more tasks of the plurality of DAGs; learn one or more machine learning processing DAG processing policies; select between a plurality of task prioritization policies for dynamically scheduling the one or more tasks; determine whether the one or more tasks of the plurality of DAGs are able to execute based on one or more constraints.

In some embodiments, the machine learning component 440 improves operations of a dynamic scheduler by 1) determining if a DAG should be dropped; 2) estimating execution time of task on PEs on the SoC, 3) determining environmental conditions such as, for example, traffic/roadway congestion, 4) learning and executing one or more machine learning based DAG processor policies; 5) selecting between multiple task prioritization policies, 6) determining when to perform task reordering and rank update, 7) determining if a non-critical task/DAG can meet its real-time constraints or should be dropped, 8) determining task wait times that can improve slow-core PE utilization, 9) determining when to use an offline machine learning model as compared to using online determine model operations, and 10) determining when to use a machine learning model for operations 1-7, as listed above.

The learning agent based application scheduling service 410 may, using the machine learning component 440, the DAG component 450, the estimation component 460, and/or the scheduler component 470, reorder or rerank the one or more tasks in the plurality of DAGs using a machine learning operation based on the plurality of constraints and conditions, the task prioritization policies, the task execution estimates, and the configurations of the heterogenous system.

In one aspect, the machine learning component 440 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Turning now 5, block diagram depicts exemplary operations of system 500 for providing learning agent based application scheduling in heterogenous systems in a computing environment. In one aspect, one or more of the components, modules, services, applications, and/or functions described in FIGS. 1-4 may be used in FIG. 5. As shown, various blocks of functionality are depicted with arrows designating the blocks' of system 500 relationships with each other and to show process flow (e.g., steps or operations). Additionally, descriptive information is also seen relating each of the functional blocks' of system 500. As will be seen, many of the functional blocks may also be considered "modules" of functionality, in the same descriptive sense as has been previously described in FIGS. 1-4. Repetitive description of like elements employed in other embodiments described herein is omitted for sake of brevity.

With the foregoing in mind, the module blocks' of systems 500 may also be incorporated into various hardware and software components of a system integrating disaggregated memory in a cloud computing environment in accordance with the present invention. Many of the functional blocks of systems 500 may execute as background processes on various components, either in distributed computing components, or elsewhere.

The system 500 may include a scheduler 530 at the operating software ("OS") level. The scheduler 530 may be a dynamic scheduler with a DAG processor 540 and a task scheduler 570. The dynamic scheduler 530 may be in communication with a heterogeneous SoC 570 having one or more processor elements such as, for example, processor element 572 ("PE 1" such as, for example, a CPU core), processor element 574 ("PE 2" such as, for example, a GPU core), and processor element 576 ("PE N" such as, for example, an accelerator).

In operation, the dynamic scheduler 520 may receive and schedule one or more real-time DAGs such as, for example, DAG's 510, which may be input DAGs of the scheduler 530. A DAG processor 540 may track dependencies in the DAG, determine task deadline, slack and priorities of the entire DAG such as, for example, each of the DAGs 510. In some embodiments, slack is the amount of time left to a deadline during execution of the DAG's tasks. Priority of a DAG can be determined based on the application domain. For example, the DAGs that are critical for an application to complete and meet the deadline might have higher priority over record keeping tasks.

The DAG processor 540 may order or re-order tasks based on a dynamic rank assigned to each of the tasks 550 and 552. The rank can be determined using deadlines/slack and priority of the DAG such as, for example, each of the DAGs 510. The task scheduler 560 may read the ordered tasks and determines an appropriate or "best" or optimal PE to schedule and assign the task such as, for example, processor element 572, processor element 574, or processor element 576. It should be noted as depicted in FIG. 5, the tasks 550 may be ready and queued while tasks 550 may be completed.

Figure 6:
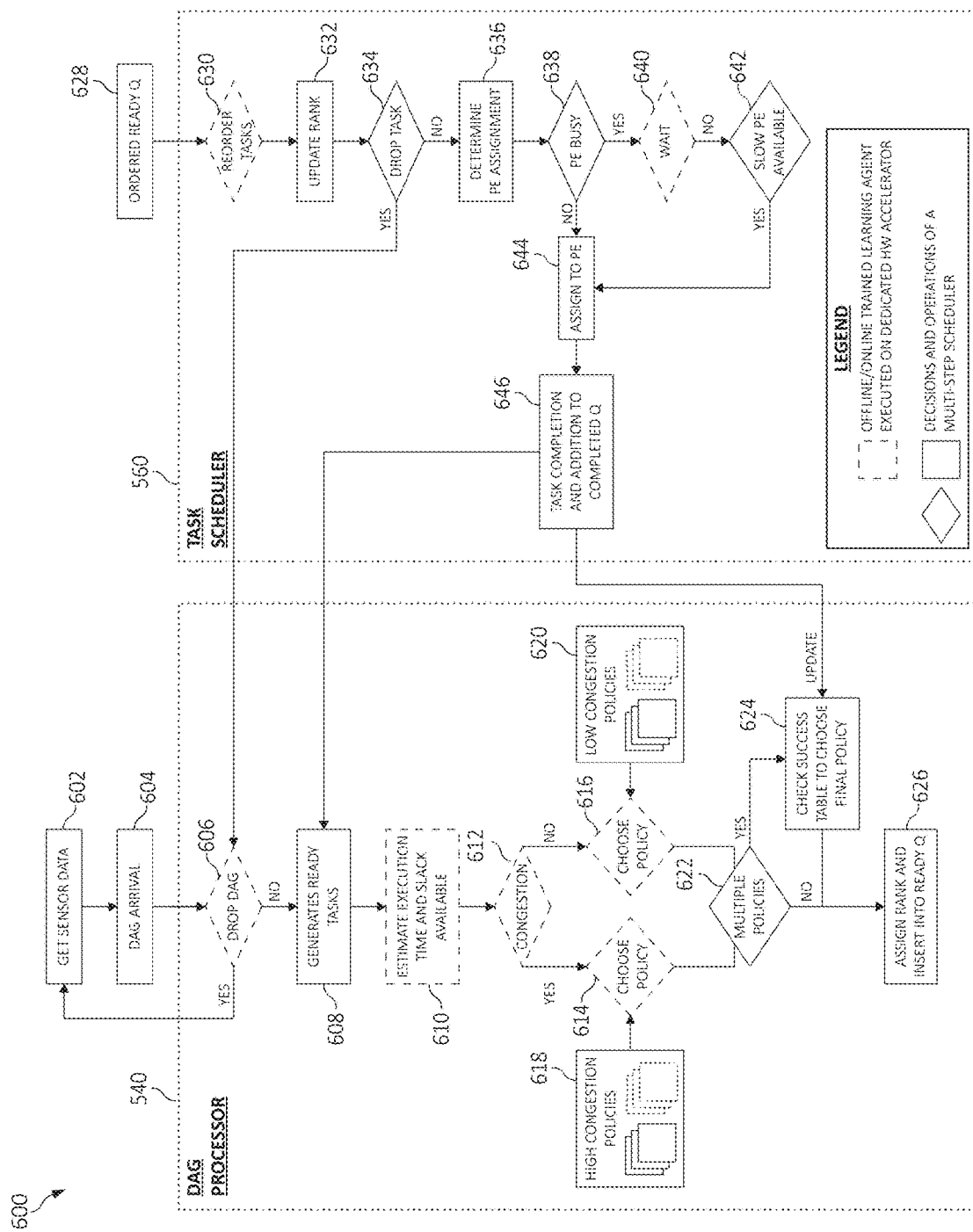
FIG. 6 is a flowchart diagram depicting an exemplary method for providing a machine learning agent for dynamic task scheduling in heterogenous systems in a computing environment according to an embodiment of the present invention.

Turning now to FIG. 6, a method 600 for providing a machine learning agent for dynamic task scheduling in heterogenous systems in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. Repetitive description of like elements employed in other embodiments described herein is omitted for sake of brevity.

Figure 5:
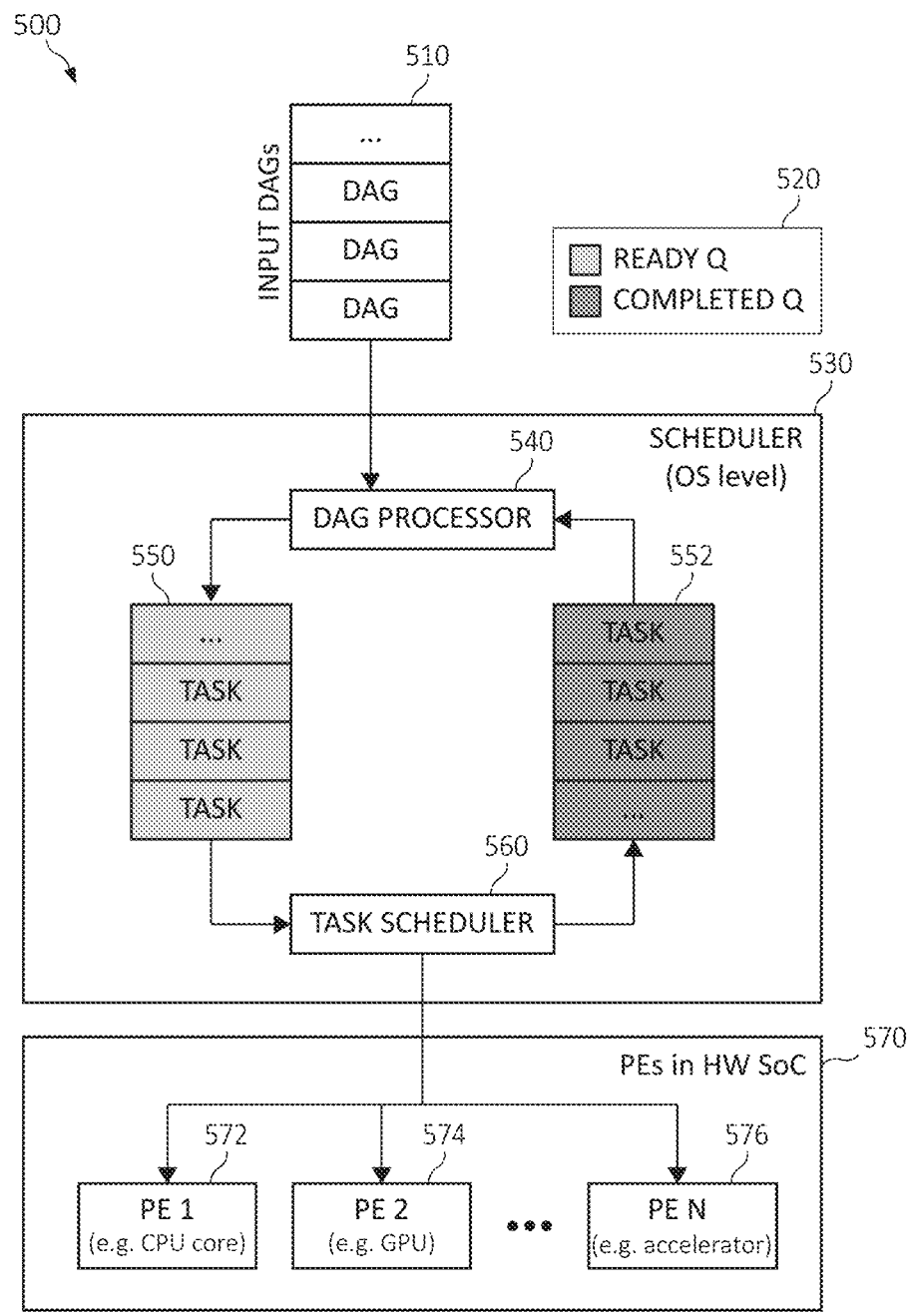
FIG. 5 depicts a block flow diagram depicting operations for providing learning agent based application scheduling in heterogenous systems in a computing environment according to an embodiment of the present invention.

As a preliminary matter, it should be noted that the DAG processor 540 and the task scheduler 560 of FIG. 5 may be collectively considered as a "learning agent" for dynamic scheduling of DAGs. A learning agent may be the dynamic scheduler 530 of FIG. 5 and used at multiple steps of a multi-step scheduler such as, for example, the task scheduler 560 to aid in the scheduling process on a heterogeneous SoC, as depicted in FIG. 6. The dynamic scheduler 530 of FIG. 5, incorporating the DAG processor 540 and the task scheduler 560 of FIG. 5, may be a machine learning mechanism and incorporate machine learning for dynamic scheduling.

The functionality 600 may start by gathering data from one or more sensors in a computing system such as, for example, the computer system/server 12 of FIG. 1 or other type of computing systems. As part of the gathering and collecting of sensor data, one or more DAG's may be received (e.g., arrived at a DAG processor 540 of FIG. 5) as input, as in block 604.

The DAG processor 540 may determine whether or not to drop (e.g., reject a DAG) a DAG, as in block 606. For example, a DAG may be dropped, ignored, or rejected based on criterion such as, for example, if a low priority DAG is not able to meet its next deadline even when assigned/executed on a fastest processing element. If yes at block 606, the drop DAG may be rejected, and the method may move back to block 602. If no at block 606, the DAG processor 540 may generate one or more tasks of the accepted DAGs to prepare for scheduling and execution, as in block 608. The DAG processor 540 may estimate execution time and available slack, as in block 610, such as, for example, estimating the execution time of task on one or more PEs on a heterogeneous SoC. The DAG processor 540 may determine various environmental conditions such as, for example, congestion (e.g., traffic congestion on a road), as in block 612.

If the environmental conditions such as, for example, congestion is yes (e.g., high congestion such as, for example, greater than a congestion threshold, percentage, range of values, a specific value) at block 614, one or more congestion policies 618 (e.g., high congestion policies) may be selected and chosen, as in block 614. Alternatively, if the environmental conditions such as, for example, congestion is no (e.g., low congestion such as, for example, congestion less than a congestion threshold, percentage, range of values, a specific value) at block 614, one or more congestion policies 616 (e.g., low congestion policies) may be selected and chosen, as in block 616. For example, heavy traffic on a road may be high congestion and light/no traffic may be low congestion. Whether congestion is high or low may be determined by a number of DAG's that have to process in a unit of time.

From blocks 614 and 616, a determination operation may be performed by the DAG processor 540 to determine whether there are multiple task prioritization policies (e.g., multiple policies), as in block 622. If no at block 622, the DAG processor 540 may assign a rank to the ready task in the DAG and then insert into a queue (e.g., a ready queue ("Q" at block 628), as in block 626. It should noted that a task is ready if all its dependencies are met and a ready queue ("ready Q") is a queue that is ordered based on the rank assigned to it by the DAG processor.

If yes at block 622, the DAG processor 540 may determine/check a table (e.g., a success table) to determine select a final policy (e.g., a final task prioritization policy) for the DAG for scheduling and executing, as in block 624. From block 624, the method 600 may move to block 626.

Moving now to the task scheduler 560, the task scheduler 560 may receive (as input), the DAG's that have been placed and ordered in a queue (e.g., the ready Q), as in block 628. The task scheduler 560 may reorder the tasks, as in block 630. The task scheduler 560 may update a ranking of each of the reordered tasks, as in block 632.

Similar to block 606, the task scheduler 560 may determine whether or not to drop (e.g., reject a DAG) a task of the DAG, as in block 634. For example, the task scheduler 560 may determine whether a task (e.g., a non-critical task/DAG) is able to meet and achieve real-time task execution constraints or should be dropped. If yes at block 634, the task may be sent back by the task scheduler 560 may to the operations at block 606. If no at block 634, the task scheduler 560 may determine a PE assignment (e.g., determine which PE to assign the task), as in block 636.

The task scheduler 560 may determine if the PE is busy (e.g., utilized or unavailable for receiving a task assignment), as in block 638. If no at block 638, the task scheduler 560 may assign a task of the DAG to the PE, as in block 644. At block 646, the task may be scheduled and executed to completion and added to a completed task queue (e.g., a complete task queue ("Q")), as in block 646. The method 600 may move from block 646 back to block 624. If yes at block 638, the task scheduler 560 may wait for the PE to become available, as in block 640. That is, the task scheduler 560 may determine task wait times that can improve PE utilization such as, for example, wait and determine a task wait time for a slow-core PE utilization. Following block 640, the task scheduler 560 may determine if the PE (e.g., a busy PE or "slow-core" PE) is now available, as in block 642. If yes, the method 600 may move back to block 644.

Figure 7:
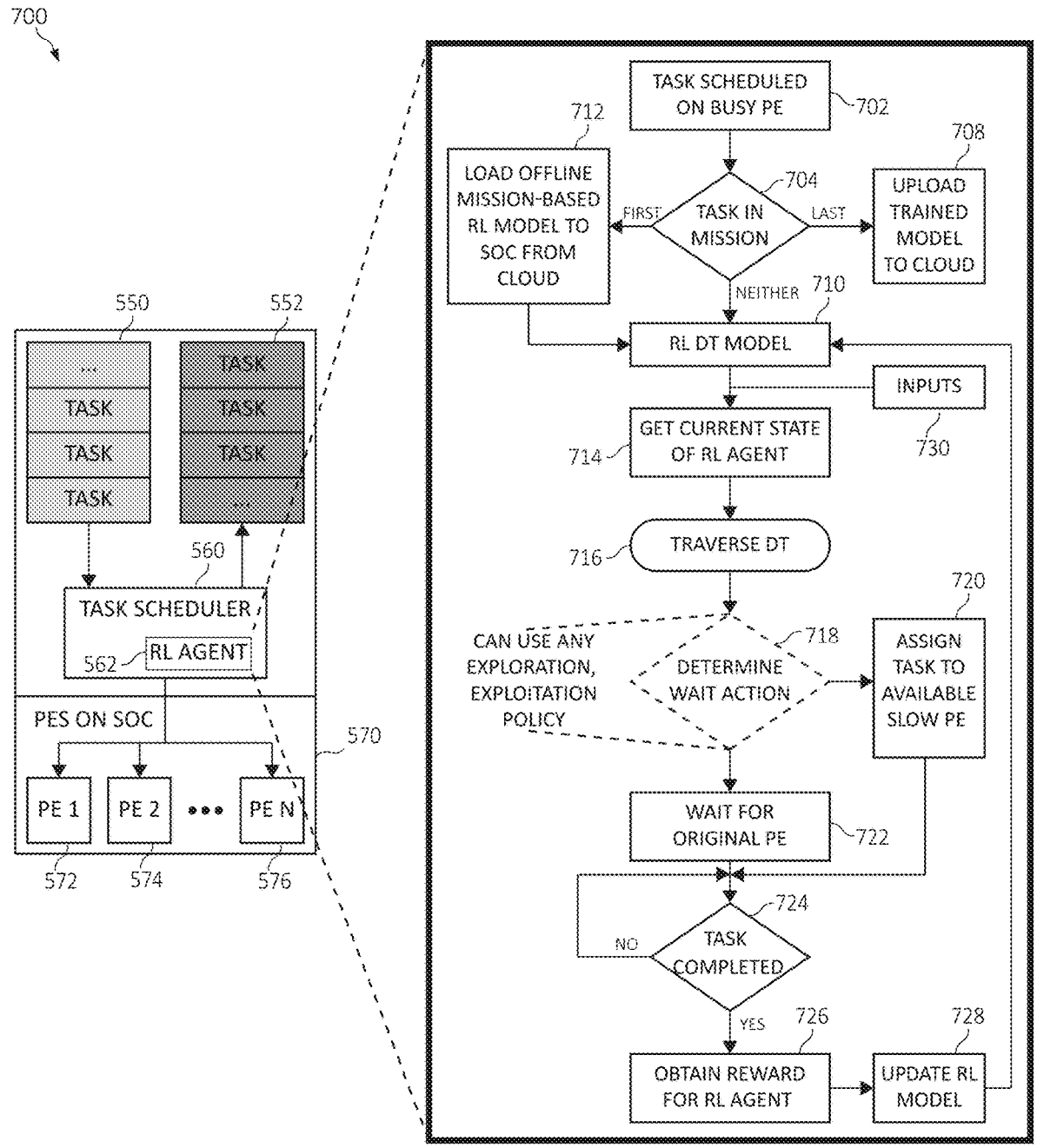
FIG. 7 is a flowchart diagram depicting an exemplary method for determining task wait times using a machine learning agent for dynamic task scheduling in heterogenous systems in a computing environment according to an embodiment of the present invention.

Turning now to FIG. 7, a method 700 for determining task wait times using a machine learning agent for dynamic task scheduling in heterogenous systems in a computing environment using a processor is depicted, in which various aspects of the illustrated embodiments may be implemented. The functionality 700 may be implemented as a method (e.g., a computer-implemented method) executed as instructions on a machine, where the instructions are included on at least one computer readable medium or one non-transitory machine-readable storage medium. Repetitive description of like elements employed in other embodiments described herein is omitted for sake of brevity.

Using a reinforcement learning ("RL") agent 562 in a task scheduler 560 of FIG. 1, the RL agent 562 may receive tasks schedule on a PE (e.g., a busy or unavailable PE), as in block 702. The RL agent may use a decision tree based RL quality ("Q") learning operation to execute each decision in the task scheduler 560. It should be noted that the RL agent 562 may be implemented as a specialized accelerator devices that enables the RL agent 562 to execute a machine learning decision in a single scheduler tick (e.g., a time scheduler takes to schedule a task on a PE).

The RL agent 562 may determine a mission type of each task such as, for example, if the task mission is first to be schedule or last, as in block 704. That is, block 704 represents the action a task scheduler has to do based on whether the task it has to schedule is the first in the mission or the last. If the task is the first task, then offline RL models, based on the type of mission being executed by the system, have to be loaded into the RL agent 562. If the task is the last task, then new learnings from the mission executed will be uploaded back to the cloud. For example, the RL agent 562 may be trained (e.g., offline training) for each mission type using supervised learning. The offline data may be collected using autonomous vehicle simulators and synthetic workload traces. Information about each DAGs may be passed as traces that allows for a lookahead approach to determine an effect of a future arriving DAGs on a current DAG. The offline trained decision tree may then be used for the initialization of the RL agent 562, which may be online.

If the mission task is the first task to arrive for a mission, at block 704, an offline mission-based RL model may be loaded to a heterogenous SoC from a cloud computing system, as in block 712. If the mission task is last task to arrive for the mission, at block 704, a trained machine learning model may be uploaded to a cloud computing system, as in block 708. If the mission task is neither first or last at block 704, a RL decision tree ("DT") model may be accessed and used for the task scheduling to a PE, as in block 710.

At block 714, a current state of the RL agent 562 may be accessed or obtained (using one or more inputs 730 such as, for example, characteristics of the mission, environmental conditions, task and systems at a given instant, etc.). In one aspect, the inputs may include, but not limited to, a number of tasks and their priorities, the status of PE's (e.g., available or unavailable for receiving a task), a number of active DAGs, environment congestion, a mission type, and slack available of parent DAG.

The RL agent 562 may traverse the DT, as in block 716. The RL agent 562 may perform a determination operation to determine a wait action for scheduling the task to a busy PE, as in block 718. The action of the RL agent 562 may be classified as an action to wait for the fastest PE (in relation to processing speeds of the other PE's), as in block 722 (e.g., an original, but faster PE) or an action to not wait and immediately schedule a task to an available, but potentially slower PE, as in block 720, (e.g., assign to a slower, but available GPU as compared to waiting for a faster accelerator). From block 718, operations may move to block 720 or 724 based on determining the wait action for scheduling the task to a busy PE.

Thus, the RL agent 562 may, during runtime, use the DT as the basis for Q-learning of the RL agent 562 to perform exploration and exploitation of various task policies. The RL agent 562 may wait, based on the determined wait time, for the PE (e.g., the original, busy PE), as in block 722. The RL agent 562 may determine if a task is completed on the processing element ("PE"), as in block 724. If no at block 724, the system will wait for the task to be completed. If yes at block 724, the RL agent 562 may obtain a reward for the RL agent 562, as in block 726. The purpose, of the RL agent 562 may obtain a reward is to reinforce and update the RL model with new experiences that the system encounters for the mission that is being executed. The RL agent 562 may update a RL model, as in block 728.

Figure 8:
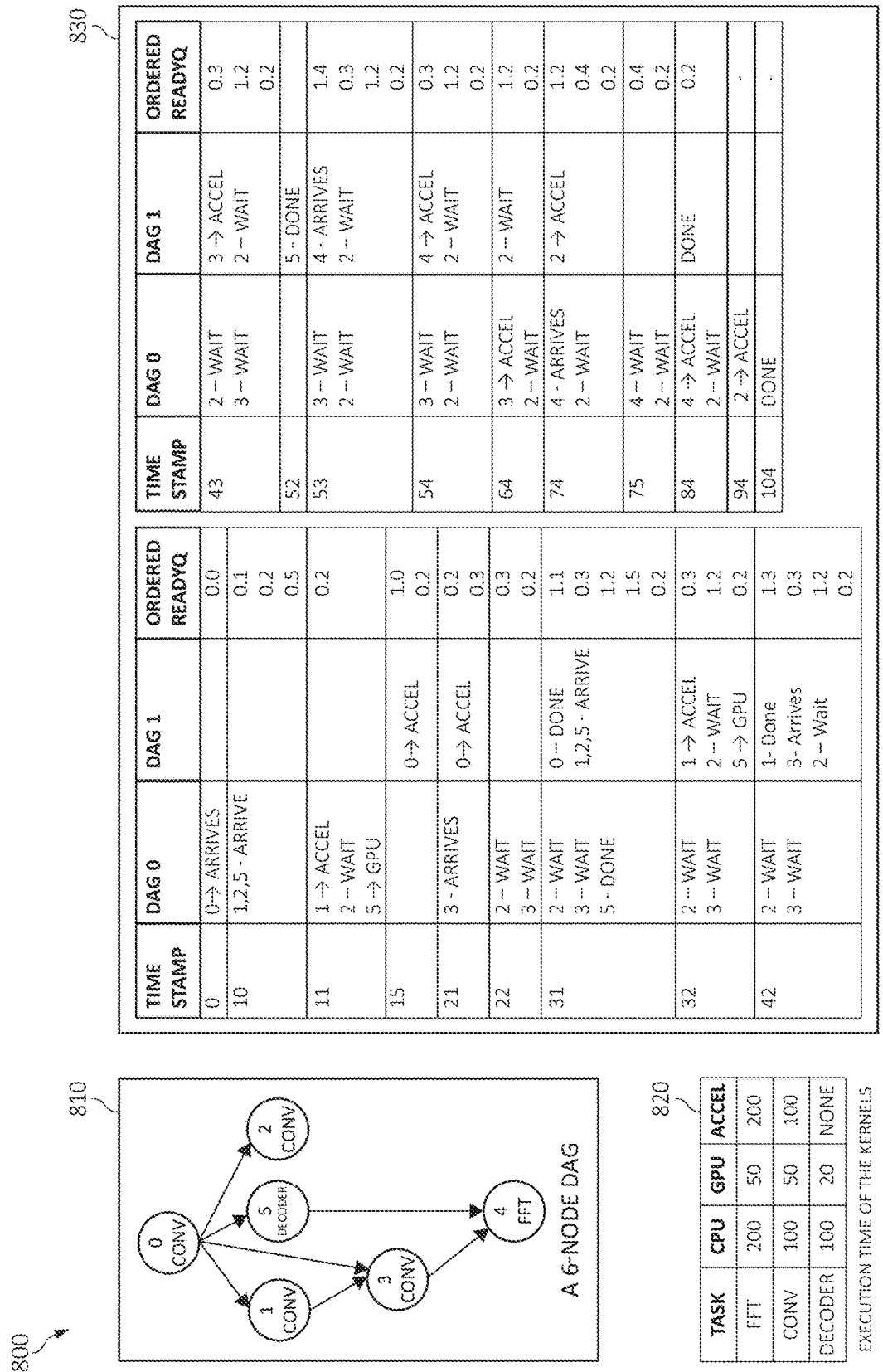
FIG. 8 is a table diagram depicting an exemplary method for dynamic task scheduling in heterogenous systems using a machine learning agent in a computing environment, by a processor, in which aspects of the present invention may be realized.

FIG. 8 is a block diagram 800 depicting an exemplary tables and graphs for illustrating dynamic task scheduling in heterogenous systems using a machine learning agent (e.g., the task scheduler 560 of FIG. 5) in a computing environment, by a processor, in which aspects of the present invention may be realized.

As depicted, diagram 800 depicts a DAG 810 having one or more tasks such as, for example, tasks 0-5. Table 820 depicts execution times kernels for the tasks, CPU, GPU, and an accelerator. Table 830 depicts the dynamic scheduling order and execution with a time stamp for DAG 0 and DAG 1 along with an ordered ready Q. It should be note that values used herein are arbitrary values and used for illustration purposes only.

As depicted, the example, includes a 6-node DAG with a node priority-1 and node priority-2 DAGs with varying kernels whose execution times are shown in table 820. In this example, the deadline for each DAG is set to 100 and a system has 4 CPUs, 2 GPUs and 1 accelerator.

In operation (as observed in Table 820 and 830), a DAG processor (e.g., the DAG processor 540 of FIG. 5) may assign rank to tasks when they are ready to be scheduled. In this example, it may be assumed that the ranks for tasks are assigned as follows by the DAG processor: task 0 a rank of 10, task 1 a rank of 10, task 2 a rank of 2, task 3 a rank of 0, task 4 a rank of 5, task 5 a rank of 3. The ordered ready queue depicts the DAG and the task. For example, at time stamp 0, the ordered ready queue depicts the DAG 0 and the task 0 (e.g., "0.0" where the first number is the DAG, and the second number presents the task).

Thus, as task 0 (a parent task) arrives at time stamp 0, task 0 will complete at time stamp 10. Since tasks 1 (e.g., convolution task), task 5 (decoder task), and task 2 (convolution task) are task dependencies of task 0, tasks 1, 5, and 2 arrive at time stamp 10. As depicted, task 2 is a convolution task and is scheduled for execution while it waits for an accelerator since task 1 was already scheduled on the only accelerator. This is depicted in the ordered ready queue depicts the DAG 0 and the task 2 (e.g., "0.2") at time stamp 11 as task 2 being schedule and waiting for a busy PE.

If the rank is same, priority 2 tasks may be ordered before priority 1 tasks. The schedule and execution of the tasks can be seen in the table 830 task in the readyQ is represented as (DAG_ID.Task_ID). For example, at time stamp 11, the DAG 0 has task 1 scheduled with an accelerator. Task 5 is scheduled with the GPU. Task 2 is now in a waiting period for an available PE. However, accessing and utilizing the RL agent such as, for example, the RL agent 562 of FIG. 6, the RL agent 562 may use machine learning and execute a correct decision for scheduling the task 2 rather than waiting such as, for example, at time stamp "11" the RL agent 562 may schedule for execution DAG 0's task 2 on a free PE (e.g., GPU) since there are four GPU's and there are available GPU's at time stamp 11. Thus, rather than waiting, as depicted in table 830 of the DAG 0's task 2 waiting until time stamp 94 for being assigned to an accelerator, by assigning the DAG 0's task 2 to a free PE (e.g., GPU), the response time of DAG 0, can be reduced to 94 cycles instead of 104 cycles and can meet the deadline.

Figure 9:
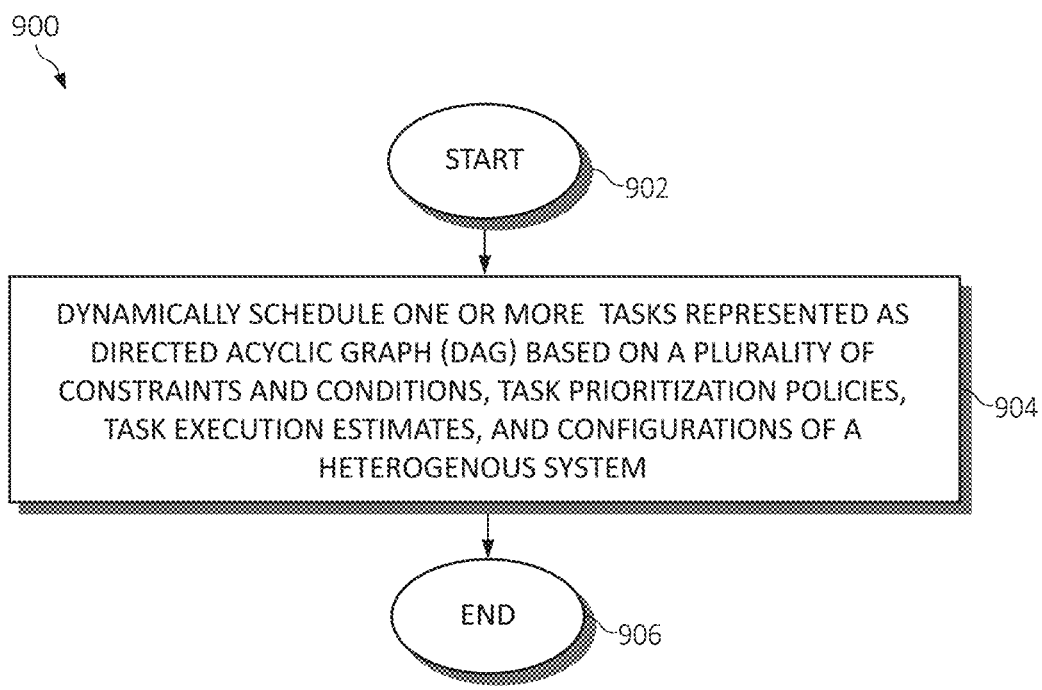
FIG. 9 is an additional flowchart diagram depicting an exemplary method for providing learning agent based application scheduling in heterogenous systems in a computing environment, by a processor, in which aspects of the present invention may be realized.

Turning now to FIG. 9, a method 900 for providing learning agent based application scheduling in heterogenous systems in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 900 may start in block 902.

Tasks of directed acyclic graphs (DAGs) may be dynamically scheduled based on a plurality of constraints and conditions, task prioritization policies, task execution estimates, and configurations of a heterogenous system, as in block 904. In an additional embodiment, a machine learning component may be initialized may be initialized (e.g. initialized, active, and/or installed) to dynamically schedule the tasks of the DAGs. The functionality 900 may end, as in block 906.

In one aspect, in conjunction with and/or as part of at least one blocks of FIG. 9, the operations of method 900 may include each of the following. The operations of 900 may track each task dependencies in each of the plurality of DAGs, where a DAG is comprised of a collection of one or more nodes connected by one or more edges, each of the nodes represents one or more tasks ordered into a sequence, and each of the edges connected to a node represents one or more constraints on the task represented by the node.

The operations of 900 may determine task priorities, task execution timelines, task wait times, and task deadlines for each of the one or more tasks of the plurality of DAGs. The operations of 900 may rank the one or more tasks in the plurality of DAGs based on the plurality of constraints and conditions, the task prioritization policies, the task execution estimates, and the configurations of the heterogenous system.

The operations of 900 may determine one or more processing elements of the heterogenous system to execute the one or more tasks in the plurality of DAGs based on the ranking. The operations of 900 may initialize a machine learning mechanism to dynamically schedule the one or more tasks in the plurality of DAGs, where the machine learning operation learns the plurality of constraints and conditions, the task prioritization policies, the task execution estimates, and the configurations of the heterogenous system.

The operations of 900 may initialize a machine learning mechanism to learn the plurality of constraints and conditions, the task prioritization policies, the task execution estimates, and the configurations of the heterogenous system; determine whether to drop and reject one or more of the plurality of DAGs; estimate an execution time for the one or more tasks of the plurality of DAGs; learn one or more machine learning processing DAG processing policies; select between a plurality of task prioritization policies for dynamically scheduling the one or more tasks; and determine whether the one or more tasks of the plurality of DAGs are able to execute based on one or more constraints.

The operations of 900 may reorder or rerank the one or more tasks in the plurality of DAGs using a machine learning operation based on the plurality of constraints and conditions, the task prioritization policies, the task execution estimates, and the configurations of the heterogenous system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for learning agent based application scheduling in heterogenous systems by one or more processors comprising:
    initializing a machine learning mechanism to:
        learn one or more machine learning processing directed acyclic graph (DAG) processing policies; and
        determine whether to drop and reject one or more of the plurality of DAGs; and
    dynamically scheduling one or more tasks of the plurality of DAGs based on a plurality of constraints and conditions, task prioritization policies, task execution estimates, and configurations of a heterogenous system, the scheduling performed using a machine learning operation.

2. The method of claim 1, further including tracking each task dependencies in each of the plurality of DAGs, wherein the DAG is comprised of a collection of one or more nodes connected by one or more edges, each of the nodes represents one or more tasks ordered into a sequence, and each of the edges connected to a node represents one or more constraints on the task represented by the node.

3. The method of claim 1, further including determining task priorities, task execution timelines, task wait times, and task deadlines for each of the one or more tasks of the plurality of DAGs.

4. The method of claim 1, further including:
    ranking the one or more tasks in the plurality of DAGs based on the plurality of constraints and conditions, the task prioritization policies, the task execution estimates, and the configurations of the heterogenous system; and
    determining one or more processing elements of the heterogenous system to execute the one or more tasks in the plurality of DAGs based on the ranking.

5. The method of claim 1, further including initializing a machine learning mechanism to learn the plurality of constraints and conditions, the task prioritization policies, the task execution estimates, and the configurations of the heterogenous system.

6. The method of claim 1, further including initializing a machine learning mechanism to:
    estimate an execution time for the one or more tasks of the plurality of DAGs;
    select between the plurality of task prioritization policies for dynamically scheduling the one or more tasks; and
    determine whether the one or more tasks of the plurality of DAGs are able to execute based on one or more constraints.

7. The method of claim 1, further including reordering or reranking the one or more tasks in the plurality of DAGs using the machine learning operation based on the plurality of constraints and conditions, the task prioritization policies, the task execution estimates, and the configurations of the heterogenous system.

8. A system for learning agent based application scheduling in heterogenous systems in a computing environment, comprising:
    one or more computers with executable instructions that when executed cause the system to:
        initialize a machine learning mechanism to:
            learn one or more machine learning processing directed acyclic graph (DAG) processing policies; and
            determine whether to drop and reject one or more of the plurality of DAGs; and
        dynamically schedule one or more tasks of the plurality of DAGs based on a plurality of 1) constraints and conditions, 2) task prioritization policies, 3) task execution estimates, and 4) configurations of a heterogenous system, the scheduling performed using a machine learning operation.

9. The system of claim 8, wherein the executable instructions when executed cause the system to track each task dependencies in each of the plurality of DAGs, wherein the DAG is comprised of a collection of one or more nodes connected by one or more edges, each of the nodes represents one or more tasks ordered into a sequence, and each of the edges connected to a node represents one or more constraints on the task represented by the node.

10. The system of claim 8, wherein the executable instructions when executed cause the system to determine task priorities, task execution timelines, task wait times, and task deadlines for each of the one or more tasks of the plurality of DAGs.

11. The system of claim 8, wherein the executable instructions when executed cause the system to:
    rank the one or more tasks in the plurality of DAGs based on the plurality of constraints and conditions, the task prioritization policies, the task execution estimates, and the configurations of the heterogenous system; and determine one or more processing elements of the heterogenous system to execute the one or more tasks in the plurality of DAGs based on the ranking.

12. The system of claim 8, wherein the executable instructions when executed cause the system to initialize the machine learning mechanism to learn the plurality of constraints and conditions, the task prioritization policies, the task execution estimates, and the configurations of the heterogenous system.

13. The system of claim 8, wherein the executable instructions when executed cause the system to initialize a machine learning mechanism to:

estimate an execution time for the one or more tasks of the plurality of DAGs;

select between a plurality of task prioritization policies for dynamically scheduling the one or more tasks; and determine whether the one or more tasks of the plurality of DAGs are able to execute based on one or more constraints.

14. The system of claim 8, wherein the executable instructions when executed cause the system to reorder or rerank the one or more tasks in the plurality of DAGs using the machine learning operation based on the plurality of constraints and conditions, the task prioritization policies, the task execution estimates, and the configurations of the heterogenous system.

15. A computer program product for learning agent based application scheduling in heterogenous systems in a computing environment, the computer program product comprising:

one or more computer readable storage media, and program instructions collectively stored on the one or more computer readable storage media, the program instruction comprising:

program instructions to initialize a machine learning mechanism to:

learn one or more machine learning processing directed acyclic graph (DAG) processing policies; and determine whether to drop and reject one or more of the plurality of DAGs; and program instructions to dynamically schedule one or more tasks of the plurality of DAGs based on a plurality of 1) constraints and conditions, 2) task prioritization policies, 3) task execution estimates, and 4) configurations of a heterogenous system, the scheduling performed using a machine learning operation.

16. The computer program product of claim 15, further including program instructions to track each task dependencies in each of the plurality of DAGs, wherein the DAG is comprised of a collection of one or more nodes connected by one or more edges, each of the nodes represents one or more tasks ordered into a sequence, and each of the edges connected to a node represents one or more constraints on the task represented by the node.

17. The computer program product of claim 15, further including program instructions to determine task priorities, task execution timelines, task wait times, and task deadlines for each of the one or more tasks of the plurality of DAGs.

18. The computer program product of claim 15, further including program instructions to:

rank the one or more tasks in the plurality of DAGs based on the plurality of constraints and conditions, the task prioritization policies, the task execution estimates, and the configurations of the heterogenous system; and determine one or more processing elements of the heterogenous system to execute the one or more tasks in the plurality of DAGs based on the ranking.

19. The computer program product of claim 15, further including program instructions to initialize a machine learning mechanism to:

estimate an execution time for the one or more tasks of the plurality of DAGs;

learn one or more machine learning processing DAG processing policies;

select between a plurality of task prioritization policies for dynamically scheduling the one or more tasks; and determine whether the one or more tasks of the plurality of DAGs are able to execute based on one or more constraints.

20. The computer program product of claim 15, further including program instructions to reorder or rerank the one or more tasks in the plurality of DAGs using the machine learning operation based on the plurality of constraints and conditions, the task prioritization policies, the task execution estimates, and the configurations of the heterogenous system.

* * * * *